(12) United States Patent
Repetti, III (10) Patent No.: US 8,020,550 B2
(45) Date of Patent: Sep. 20, 2011

(54) INTERVENING HEAT CONDUCTING MEDIUM

(76) Inventor: Daniel J. Repetti, III, Bayonne, NJ (US)

(*) Notice: Subject to any disclaimer, the term of this patent is extended or adjusted under 35 U.S.C. 154(b) by 126 days.

(21) Appl. No.: 12/467,015

(22) Filed: May 15, 2009

(65) Prior Publication Data

US 2009/0218359 A1 Sep. 3, 2009

Related U.S. Application Data (63) Continuation-in-part of application No. 11/657,865, filed on Jan. 25, 2007, now Pat. No. 7,703,452.

(51) Int. Cl.
*A47J 27/02* (2006.01)

(52) U.S. Cl. .............. 126/376.1; 126/375.1; 126/214 D; 99/447; 99/645; 220/580

(58) Field of Classification Search .............. 126/214 D, 126/375.1, 376.1; 99/447, 645
See application file for complete search history.

(56) References Cited

U.S. PATENT DOCUMENTS

| | | | | |
|---|---|---|---|---|
| 227,369 A * | 5/1880 | Lott | ................................ | 126/266 |
| 269,313 A * | 12/1882 | Ogborn | ...................... | 126/376.1 |
| 611,376 A * | 9/1898 | Craig | ............................ | 126/215 |
| 834,733 A | 10/1906 | Jeha | | |
| 936,482 A * | 10/1909 | Seeley | .............................. | 126/43 |
| 1,352,001 A * | 9/1920 | Hojgaard | ................... | 126/374.1 |
| 1,353,265 A * | 9/1920 | Oshige | ........................... | 126/215 |
| 1,367,333 A * | 2/1921 | Truesdell | ...................... | 126/215 |
| 1,592,729 A * | 7/1926 | Feist | ......................... | 126/214 D |
| 1,622,587 A * | 3/1927 | Housel | ........................ | 126/383.1 |
| 1,698,225 A * | 1/1929 | Dick | ............................ | 126/376.1 |
| 1,710,971 A * | 4/1929 | Dick | ............................ | 126/376.1 |
| 1,728,107 A * | 9/1929 | Conover | ............................ | 126/42 |
| 1,787,171 A * | 12/1930 | Alfred et al. | ............... | 126/376.1 |
| 1,927,686 A * | 9/1933 | Charles | ........................... | 219/433 |
| 1,984,708 A * | 12/1934 | Surges | ........................... | 431/356 |
| 2,014,931 A * | 9/1935 | Genovar, Jr. | ............... | 126/390.1 |
| 2,080,592 A * | 5/1937 | Zickler | ........................ | 126/376.1 |
| 2,237,081 A * | 4/1941 | Owens | ........................... | 126/25 R |
| 2,431,193 A * | 11/1947 | Nielsen | ........................ | 126/376.1 |
| 2,522,085 A * | 9/1950 | Beckemeyer et al. | ......... | 219/433 |
| 2,605,382 A * | 7/1952 | Kircher et al. | ................ | 219/433 |
| 2,797,298 A * | 6/1957 | Shiro | ........................... | 219/443.1 |
| 3,065,855 A * | 11/1962 | Edwards | ........................ | 210/469 |
| 3,209,746 A * | 10/1965 | Fronza | ........................ | 126/374.1 |

(Continued)

FOREIGN PATENT DOCUMENTS

SU 1752339 A1 * 8/1992

*Primary Examiner* — Kenneth B Rinehart
*Assistant Examiner* — Jorge Pereiro
(74) *Attorney, Agent, or Firm* — Ward & Zinna, LLC (57) ABSTRACT

A device for recovering, harnessing and reutilizing heat from along a side wall of a cooking vessel, a cooking vessel comprising such device, and a method of using such device. The device can be constructed as part of the cooking vessel or can be an accessory that attaches to different sized cooking vessels via adjusting means. Specifically, the device is made of a highly conductive and durable metal or metal alloy and comprises a skirt-like body, extending from the side of the cooking vessel and attached to a perforated slip-like portion that may be attached to or integrated into the side wall of the cooking vessel. The device harnesses and reutilizes heat from the underside of the body and safely and efficiently transfers the heat to the cooking vessel through conduction. The device can further comprise diffusers, a bottom portion with a plurality of ventilation openings, and a heat shield.

35 Claims, 10 Drawing Sheets

U.S. PATENT DOCUMENTS

| | | | |
|---|---|---|---|
| 3,391,687 A * | 7/1968 | Hutner, Jr. et al. | 126/215 |
| 3,658,049 A * | 4/1972 | Gerber | 126/215 |
| 3,960,134 A * | 6/1976 | Scott | 126/24 |
| 3,982,479 A * | 9/1976 | Sova | 99/447 |
| 4,014,315 A * | 3/1977 | Lagunilla | 126/275 R |
| 4,296,728 A * | 10/1981 | Hofstetter | 126/376.1 |
| 4,320,736 A * | 3/1982 | Sharon | 126/19 M |
| 4,337,752 A * | 7/1982 | Leounes | 126/215 |
| 4,532,911 A * | 8/1985 | Orter | 126/27 |
| 4,646,717 A * | 3/1987 | Baggioli | 126/376.1 |
| 5,125,393 A * | 6/1992 | Levitin | 126/376.1 |
| 5,193,524 A * | 3/1993 | Loyd et al. | 126/374.1 |
| 5,195,500 A * | 3/1993 | Lerner | 126/29 |
| 5,348,187 A * | 9/1994 | Schultz | 220/752 |
| 5,373,836 A * | 12/1994 | Mifune et al. | 126/376.1 |
| 5,499,576 A * | 3/1996 | Grunder | 99/421 H |
| 5,564,589 A * | 10/1996 | Fu et al. | 220/608 |
| 5,813,643 A * | 9/1998 | Zybert | 248/310 |
| 5,829,343 A * | 11/1998 | Sunshine | 99/432 |
| 6,095,366 A * | 8/2000 | Sova | 220/366.1 |
| 6,593,550 B1 * | 7/2003 | Royer | 219/429 |
| 6,718,966 B1 * | 4/2004 | Barbour | 126/25 R |
| 7,357,272 B2 * | 4/2008 | Maxwell | 220/785 |
| 7,472,696 B2 | 1/2009 | Anibas | |
| 7,472,698 B1 * | 1/2009 | Anibas | 126/1 R |
| 7,533,605 B1 * | 5/2009 | Morgan | 99/410 |
| 7,538,300 B1 * | 5/2009 | Tippmann et al. | 219/439 |
| 7,694,671 B2 * | 4/2010 | Lee | 126/214 D |
| 2003/0154866 A1 * | 8/2003 | Amar | 99/422 |
| 2007/0034198 A1 * | 2/2007 | Arad | 126/9 R |
| 2007/0221650 A1 * | 9/2007 | De Oliveira | 219/386 |
| 2008/0178861 A1 | 7/2008 | Repetti | |

* cited by examiner

INTERVENING HEAT CONDUCTING MEDIUM

CROSS-REFERENCE TO RELATED APPLICATIONS

This application is a Continuation-in-part Application of U.S. application Ser. No. 11/657,865, filed Jan. 25, 2007, the entire contents of which is herein incorporated by reference.

FIELD OF THE INVENTION

The invention generally relates to the field of cooking vessels and more specifically, the invention relates to saving heat in cooking vessels by controlling heat loss during the cooking process.

BACKGROUND OF THE INVENTION

A vast amount of energy is consumed by modern civilization, forcing nations to expend considerable resources into conserving energy. The U.S. government encourages industries to produce energy efficient appliances and awarding an Energy Star designation to appliances that exceed industry efficiency averages. Yet, energy can be also conserved utilizing simple techniques and specially configured tools.

One large source of energy usage is cooking. Typically, a conventional cooking vessel (e.g., pots, pans, casseroles, etc.) is heated from a heat source such as a stove top burner, which heats the bottom of the vessel. This in turn, cooks the contents therein. This heating process is somewhat inefficient when used with a standard pot or pan, because much of the heat escapes to the sides, between the cooking vessel and the burner, and into the atmosphere increasing air pollution. All of these factors cause energy loss and make heating the vessel difficult. To avoid some heat loss, cooking vessels are manufactured from heat-conducting materials that heat up fast and maintain heat. However, such cooking vessels become dangerous as they get extremely hot, and the problem of heat loss into the atmosphere is not minimized.

Heat-conserving accessories are also available. For example, constricting rings, which are placed on the stove top and, are widely available. The ring collects and directs around the burner heat to the vessel located above the burner, which prevents heat from escaping to the sides. These accessories, however, can become hazardous since pressure tends to build up inside of them. In addition, these accessories are inefficient because they block oxygen from the burner flame and are difficult to configure for different types of stoves.

Other heat conserving accessories, such as heat distributing plates, are also known in the art. They are generally made of a single heat-conducting material or two layers of material with a hollow inner space, which traps heat. The plates are placed between the cooking vessel and the stove burner to capture the heat and distribute it along the cooking vessel's bottom surface. These plates, however, take a considerable amount of time to cool off and are often made of heavy materials that are not ideal for easy maneuverability in a kitchen.

Accordingly, a need exists for a cooking accessory, which improves the heating efficiency of stove tops, allowing cooking vessels to heat faster and save energy. Additionally, a need exists for a cooking accessory that is safely operable and user friendly.

SUMMARY OF THE INVENTION

The invention is an intervening heat conducting medium having a skirt-like device connected to a slip-like portion, both of which may be attached to a cooking vessel. The device increases the vessel's ability to efficiently utilize heat emitted from a heat source by preventing heat loss into the atmosphere. Advantageously, a cooking vessel equipped with the device heats faster than cooking vessels not utilizing the device. The device also allows to use the cooking vessel at a low stove top setting to reach substantially similar temperatures as cooking vessels not using the device at high stove top setting. In addition, the device alone, or in combination with a fitted cooking vessel lid, can maintain heat and continue to cook contents within the cooking vessel even after the stove top heat source had been turned off. Thus, the invention saves time, energy and money. The ecological benefits of the invention should not be overlooked. Over a period of time, the invention will minimize energy consumption, thereby aiding in the global quest for energy conservation.

Virtually everyone who cooks can benefit from this unique energy saving design, including restaurants, caterers, average families, military bases, or the like. Given the design advantages of this invention, its utility and convenience are economical and practical. The device can be safely used with most conventional stoves and heat sources, i.e., natural gas, electric, propane or the like.

The device harnesses heat that normally would be lost in the cooking process. The cooking vessel dimensions as well as the size, shape and position of the device contribute to the safe transfer of heat from the burner to the bottom of the cooking vessel and up the sides, where it makes contact with the skirt portion of the device. The heat is then transferred via conduction to the cooking vessel via the slip portion of the device, utilizing the law of heat flow in the process. Moreover, the heat follows the shape of the device and banks down the sides of the cooking vessel. The heat circulates under the device, further heating the slip portion on the sides of the vessel. The placement of the device in relationship to the bottom of the cooking vessel allows for the safe transference and circulation of heat into the air.

The device will preferably be a stand-alone item that can be attached and detached from a cooking vessel. However, vessels could be manufactured such that the device will be a permanent fixture. The device is preferably constructed of a durable metal or metal alloy that will not warp during the cooking process.

One object of the invention is to provide a cooking vessel that controls heat loss during the cooking process.

Another object of the invention is to provide a device that uses less energy and creates less pollution.

Another object of the invention is to provide a device that cooks by using the law of heat flow and uses conduction and convection to cook.

Another object of the invention is to provide a device that acts as an insulator, keeping the food in the cooking vessel hotter, long after the heat is removed.

Another object of the invention is to provide a device that minimizes heat loss safely and effectively from a cooking vessel while efficiently cooking its contents.

Another object of the invention is to provide a device that can expand and contract during heating without warping.

Another object of the invention is to provide a cooking accessory that harnesses, recovers and reutilizes the heat that would normally escape up the sides of the cooking vessel.

Another object of the invention is to provide a cooking accessory that enables faster cooking with less energy expenditure than cooking without it.

Another object of the invention is to provide a cooking accessory that enables faster cooking through conduction and convection.

Another object of the invention is to provide a cooking accessory that saves time, energy and money.

Another object of the invention is to minimize energy consumption and aid in the global quest to conserve energy and create less pollution.

Another object of the invention is to provide a cooking accessory that can be utilized with different sized cooking vessels.

Another object of the invention is to provide a cooking accessory that is safe and easy to use.

In one embodiment of the invention, a device for attachment to a side wall of a cooking vessel is provided comprising a cylindrical element mounted to or attached to the side wall of the cooking vessel at a first elevation above a bottom end portion of the cooking vessel. The device also includes a perforated portion attached to the cylindrical element, where the perforated portion is cylindrical and extends from the first elevation to the bottom end portion of the cooking vessel. The device also has a body element extending from the cylindrical element and comprises a plurality of ventilation openings, where the body element is attached to or secured to or is one with the cylindrical element. The body element extends about a periphery of the cooking vessel and downwardly to a second elevation above the bottom end portion of the cooking vessel.

In another embodiment of the invention, a cooking vessel is provided containing a bottom end portion, a side wall and an opening at a top end portion of the cooking vessel. The cooking vessel also includes a cylindrical element, where the cylindrical element is integrated to the side wall of the cooking vessel at a first elevation above the bottom end portion of the cooking vessel. Also included is a perforated portion attached to the cylindrical element and a body element extending from the cylindrical element. The body element is attached to or secured to the cylindrical element. The body element and the cylindrical element may also be one piece. The body element also extends about a periphery of the cooking vessel and downwardly to a second elevation above the bottom end portion of the cooking vessel. The slip portion, which wraps around and which is in flush contact with the vessel may or may not have perforations.

BRIEF DESCRIPTION OF THE DRAWINGS

A further understanding of the invention can be obtained by reference to preferred embodiments and corresponding alternate embodiments as set forth in the illustrations of the accompanying drawings. Although the illustrated embodiments are merely exemplary of systems for carrying out the invention, both the organization and method of operation of the invention, in general, together with further objectives and advantages thereof, may be more easily understood by reference to the drawings and the following description. The drawings are not intended to limit the scope of this invention, which is set forth with particularity in the claims as appended or as subsequently amended, but merely to clarify and exemplify the specific methods and instrumentalities disclosed.

For a more complete understanding of the invention, reference is now made to the following drawings in which.

DETAILED DESCRIPTION OF THE PREFERRED EMBODIMENTS

Detailed illustrative embodiments of the invention are disclosed herein. However, techniques, systems and operating structures in accordance with the invention may be embodied in a wide variety of forms and modes, some of which may be quite different from those in the disclosed embodiments. Consequently, the specific structural and functional details disclosed herein are merely representative, yet in that regard, they are deemed to afford the best embodiments for the purposes of disclosure and to provide a basis for the claims herein, which define the scope of the invention. The following presents a detailed description of preferred embodiments (as well as some alternative embodiments) of the invention.

According to the law of heat flow, heat flows from a hot substance to a cold substance. The colder of two bodies in contact with each other will absorb heat until both objects are the same temperature. Heat may be conducted from one body to another by direct contact of the two bodies or by an intervening heat conducting medium, which is the subject of the disclosed invention. Generally, conduction heat transfer is considered to occur between two points, with the energy source at a constant temperature at one point. The other point will increase to some steady temperature lower than that of the energy source. This condition is known as steady state. Once steady state is reached, thermal conductivity is the dominant heat transfer property. So, through conductivity, the contents of the vessel will heat and cook from the sides inward as well as upward. The intervening heat conducting medium, when used correctly, will waste practically very little energy. Ideally, steady state will cause the cooking utensil to come to simmer sooner. So, if time is a factor, the burner setting initially may be set to medium or high and adjusted to a lower setting soon after as steady state is reached. The intervening heat conducting medium includes a plurality of openings to allow for excess heat to safely vent, if the burner setting is not coordinated with the intervening heat conducting medium's capacity to harness, absorb and transfer its energy.

Figure 1A:
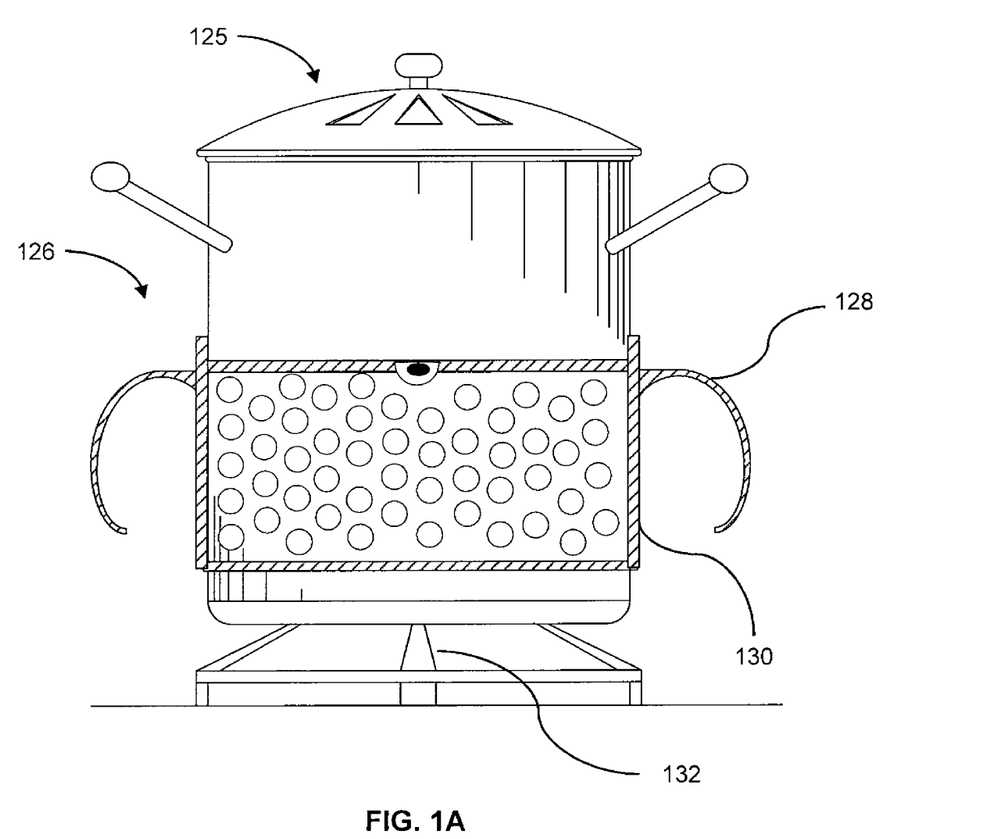
FIG. 1A illustrates a removable and adjustable device for harnessing and transferring heat in accordance with the invention.

Referring to the drawings, wherein like numerals indicate like elements throughout, FIG. 1A shows an adjustable and removable device 126 attached to cooking vessel 125 according to an embodiment of the invention. Particularly, device 126 has a generally cylindrical "slip" portion 130 coupled to a "skirt-like" body portion 128. Device 126 is utilized to be placed onto cooking vessel 125 in order to recover, harness and reutilize heat emanating from a heat source 132 in order to heat cooking vessel 125 and tripling the area heated in conventional cookware while using less energy.

Figure 1B:
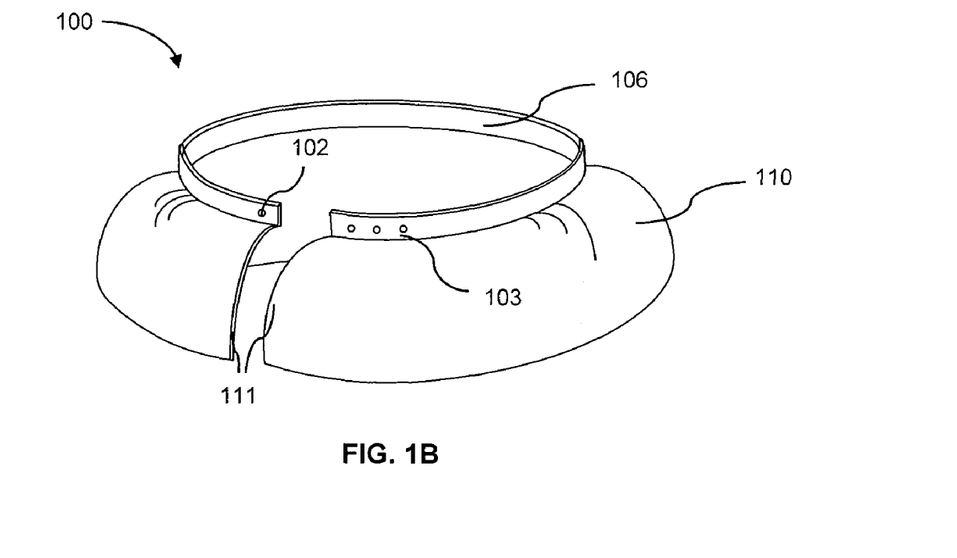
FIGS. 1B, 1C and 1D illustrate a removable and adjustable device shown in FIG. 1A for harnessing and transferring heat in accordance with the invention.
Figure 1C:
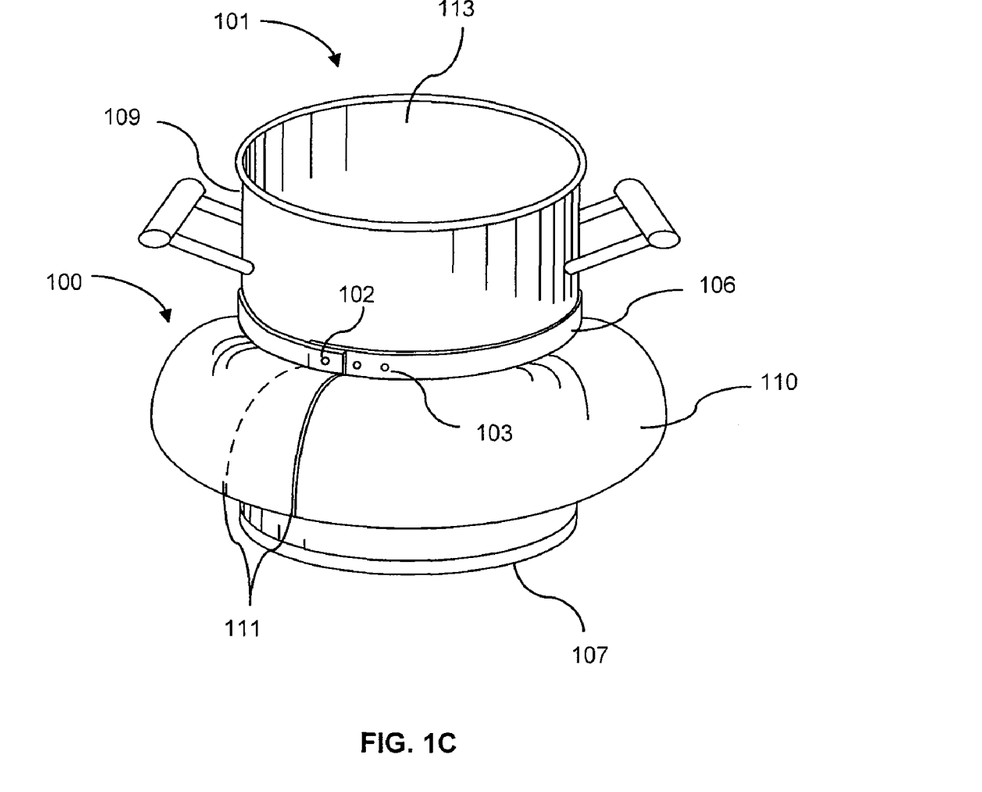
Figure 1D:
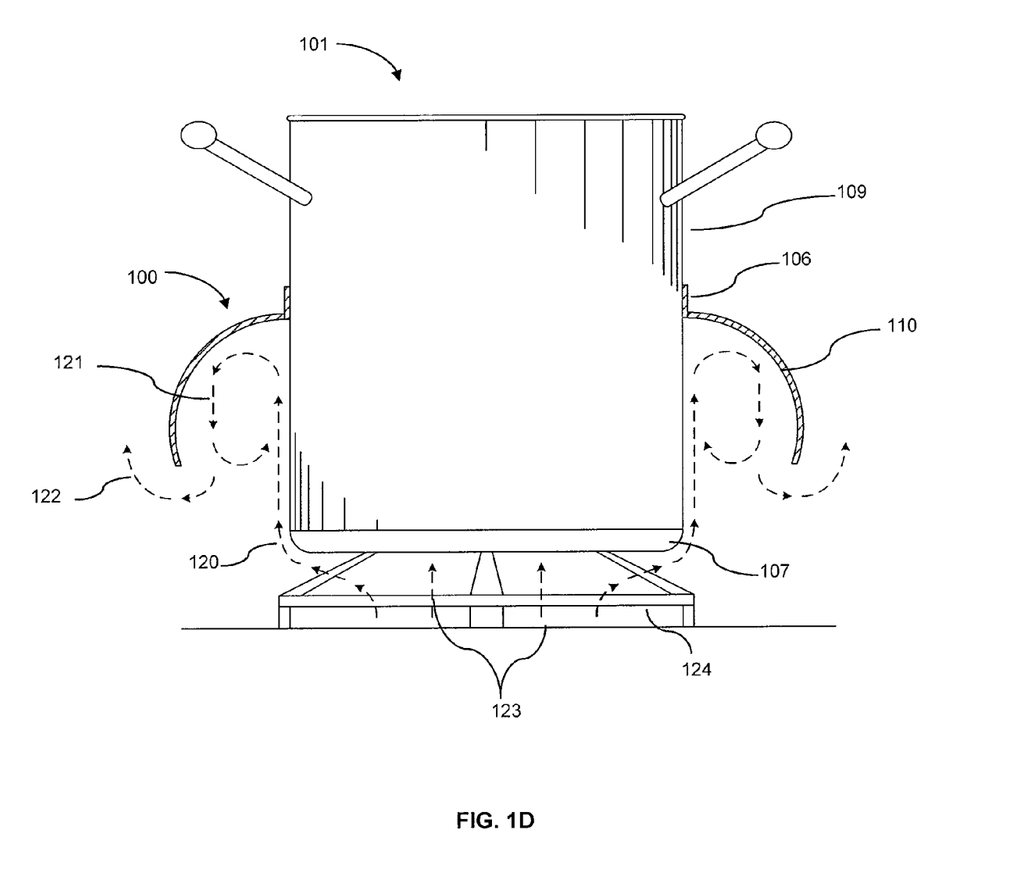

FIGS. 1B, 1C, and 1D show an adjustable and removable device 100 having cylindrical portion 106 and a skirt-like body 110. Of course, the device can be of any other shape capable of harnessing and transferring heat as later described. Device 100 may be cut along walls 111 to allow the device 100 to be assembled on and removed from a cooking vessel. Any other ways of assembling device 100 on vessel 101 may be used without departing from the scope of the invention. For example, the device can comprise one, two or more substantially equivalent body sections that are fitted and secured around cooking vessel 101. Additionally, the thickness of the skirt 100 should be at least as thick as cooking vessel 101 in order to efficiently transfer heat to cooking vessel 101.

Cylindrical portion 106 also comprises attachment means 102 to attach device 100 to side wall 109 of cooking vessel 101. Further, cylindrical portion 106 can comprise adjusting means 103 to adjust cylindrical portion 106 and thereby device 100 to fit different sized cooking vessels. As shown in FIG. 1B, device 100 is wrapped around cooking vessel 101 and positioned at a desired location. Then, device 100 is adjusted to hug the exterior surface of side wall 109 by bringing walls 111 together and overlapping the device sections. When device 100 is tightly position on side wall 109, it is secured in place via attachment means 102. Attachment means 102 may include, but are not limited to, a clasp, buckle, bolt, screw, pin, rivet, snap, magnets, male to female connection, strap or the like. For example, multiple pins 103 are illustrated on one side of cylindrical portion 106. The selected pin is determined by the size of the diameter of the cooking vessel. Optionally, pins 103 can each be labeled to indicate the corresponding pot diameter.

In use, following the placement of device 100 onto cooking vessel 101, cooking vessel 101 with contents to be cooked is placed on or in a close upward proximity to a heat source 124 (e.g., a burner), as illustrated in FIG. 1C. Heat from energy source 124 rises along direction 123 and heats up the bottom wall 107 of cooking vessel 101. Additionally, heat rises, runs up side wall 109 of cooking vessel 101 along direction 120, and is caught underneath device 100. Under device 100, the heat banks down by the upper section of body 110, follows the shape of the body's underside and circulates along direction 121. As the heat circulates under device 100, it continuously heats side wall 109 of cooking vessel 101 through conduction. As such, cooking vessel 101 is exposed to more heat than if device 100 was not present, thereby heating the contents inside cooking vessel 101 faster. Advantageously, as the heat circulates under device 100, it transfers heat onto cooking vessel wall 109, and exits if too much heat enters the device along direction 122. This process allows more area of cooking vessel 101 to be heated, more than tripling the area heated in conventional cookware, while using less energy.

Preferably, the device will be manufactured from a durable metal alloy or any other like material known in the art that will not warp under exposure to operational heat. Some other desirable material properties include smoothness, high thermal conductance, lightweight, and high melting point. Furthermore, the exterior surface of body 110 may be coated or be cased in a heat shield. The heat shield keeps the outside surface of the device relatively cool and safe to the touch.

Device 100 is preferably positioned with enough distance from bottom wall 107 of cooking vessel 101 to allow safe operation. As such, heat is not completely restrained under device 100 but can instead safely escape into to the atmosphere if the burner setting is too high. Additionally, the shape of the device body 110 should provide a smooth path for the heat to enter device 100, circulate therein, and exit. This can be achieved most preferably by a smooth and rounded body shape. Also, the distance between the side portion of device 100 and side wall 109 of cooking vessel 101 should be large enough to allow heat circulation along direction 121. For example, a cooking vessel 10 inches in height and 8-9 inches in diameter can be fitted most preferably with a device that is 3½ inches tall and 2 inches wide. The device can be placed 4½ inches from the top of cooking vessel 101, leaving a 2 inch clearance on the bottom for excess heat to escape, if necessary. As such, the device is large enough to allow heat to circulate within and safely escape to the atmosphere if necessary. The thickness of the device 100 may be the same as the thickness of the cooking vessel 101.

Figure 2A:
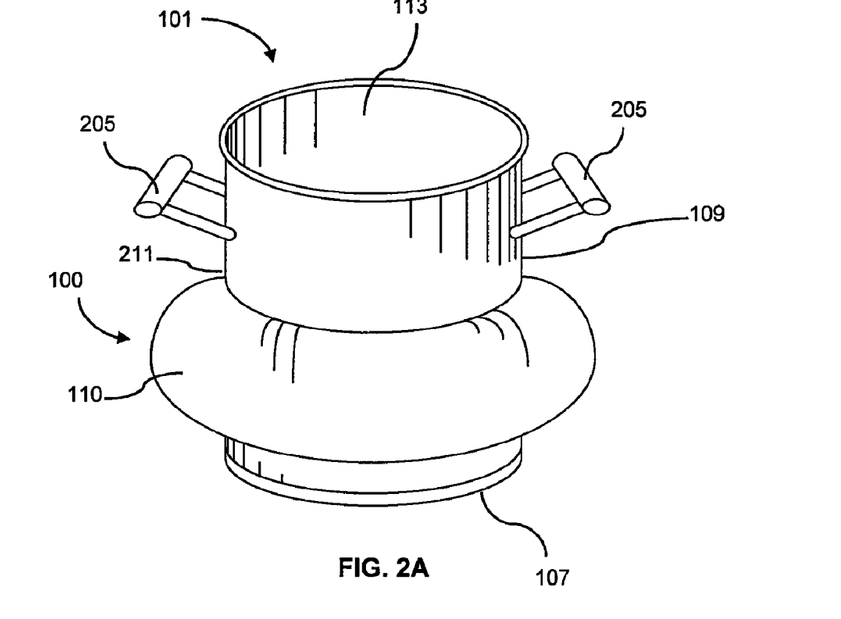
FIGS. 2A and 2B illustrate a cooking vessel with a device for harnessing and transferring heat in accordance with the invention.
Figure 2B:
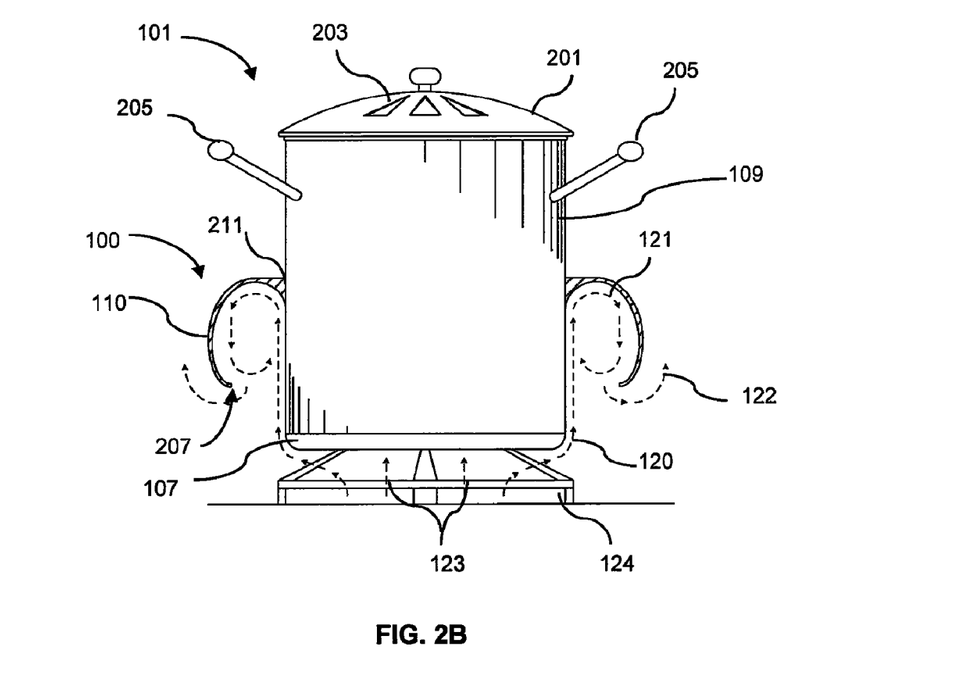

Additionally, cooking vessels can be offered pre-manufactured with the device for harnessing and reutilizing heat. FIGS. 2A and 2B illustrate cooking vessel 101 having a body comprising bottom wall 107, side wall 109, and opening 113. Device 100, in accordance with the invention, comprises body 110 connected to an outer perimeter of side wall 109 at connection 211. Device 100 can be welded onto side wall 109 of cooking vessel 101 or can be mounted via attachment means such as screws, bolts, pins, or the like. As illustrated, body 110 can further comprises lip portion 207 which adds curvature to body 110, thus assisting with directing heat circulation.

Cooking vessel 101 could also optionally contain insulated handles 205 that extend from side wall 109 of cooking vessel 101. Further, a cover 201 with adjustable vents 203 may optionally be provided to close cooking vessel opening 113. This allows for more heat to be conserved within cooking vessel 101 while vents 203 helps to prevent contents therein to boil over. Also, cover 201 assists device 100 to maintain heat and continue to cook contents inside cooking vessel 101 after the stove top heat source had been turned off. Cover 201 may also comprise a sealing mechanism to securely seal it on cooking vessel.

Figure 3A:
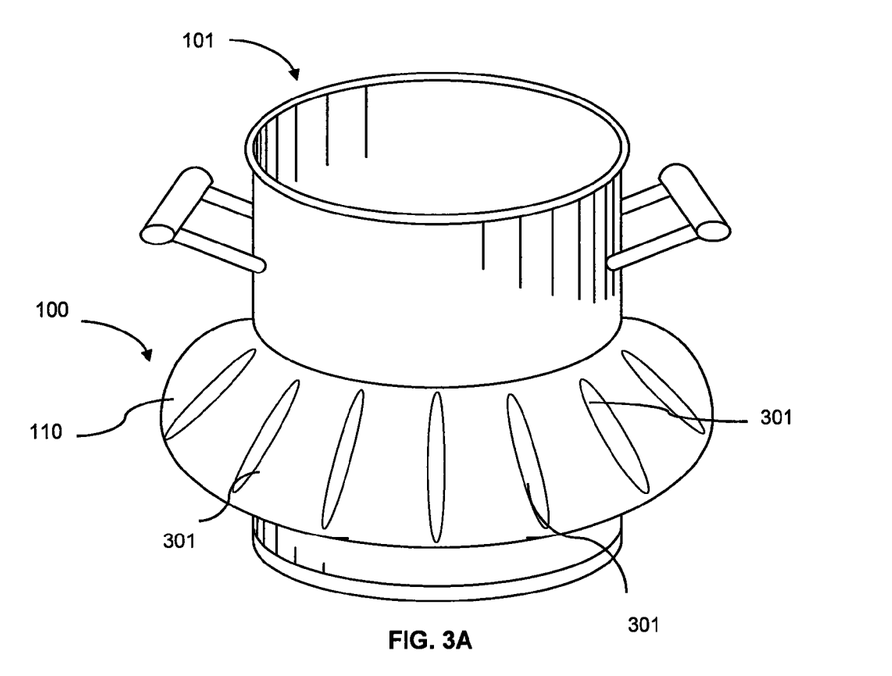
FIG. 3A illustrates a perspective view of a cooking vessel with a device comprising a plurality of diffusers for circulating heat and for strength of design in accordance with the invention.
Figure 3B:
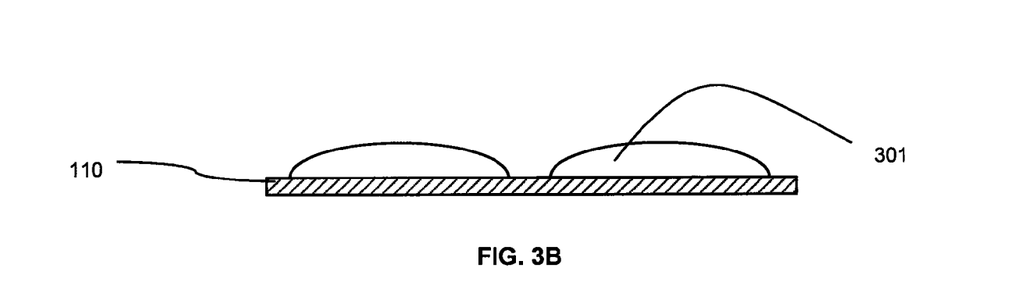
FIG. 3B illustrates a cross-sectional view of a diffuser shown in FIG. 3A in accordance with the invention.
Figure 3C:
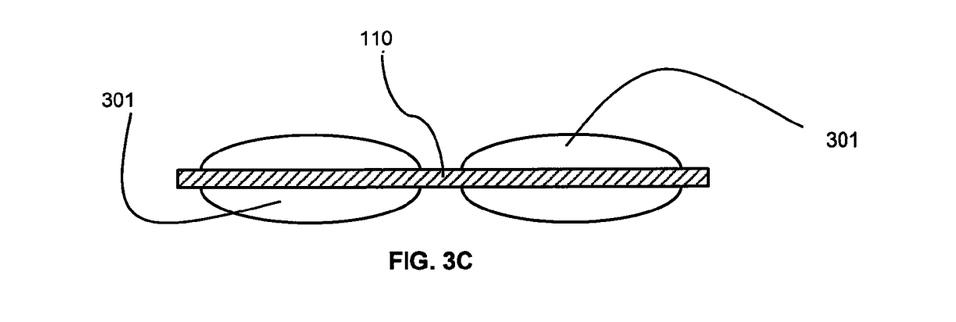
FIG. 3C illustrates a cross-sectional view of a diffuser shown in FIGS. 3A and 3B in accordance with the embodiments of the invention.

FIGS. 3A and 3B illustrate cooking vessel 101 wherein device 100 comprises plurality of diffusers 301 extending from the interior surface of body 110. Diffusers 301 are semi-spherical in shape and may be ⅛ inch in height and spaced about 1 inch from an adjoining diffuser. Diffusers 301 add additional strength to device 100 thereby adding to its ability not to bend or warp under heat. In an alternate embodiment, shown in FIG. 3C, diffusers 301 may be added to both the outside and interior surfaces of body 110 in order to add additional strength to device 100. Other means that assist heat transference may be utilized without departing from the scope of the invention.

Figure 4A:
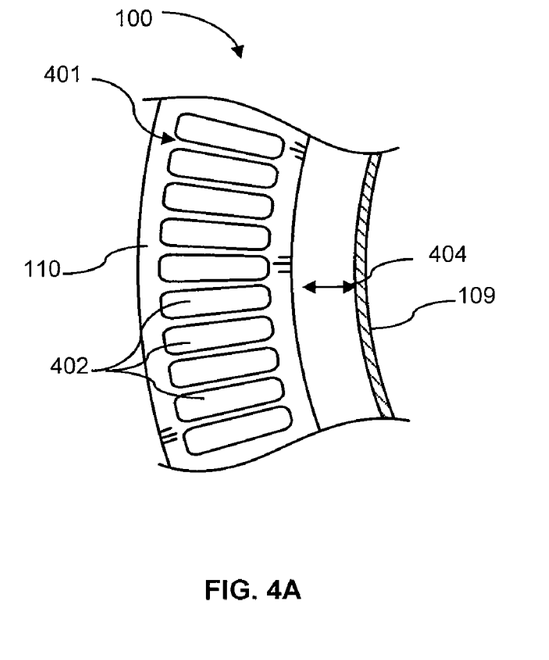
FIGS. 4A and 4B illustrate a view of a cooking vessel with a device comprising a bottom portion with a plurality of ventilation openings to allow for excess heat to escape in accordance with the invention.
Figure 4B:
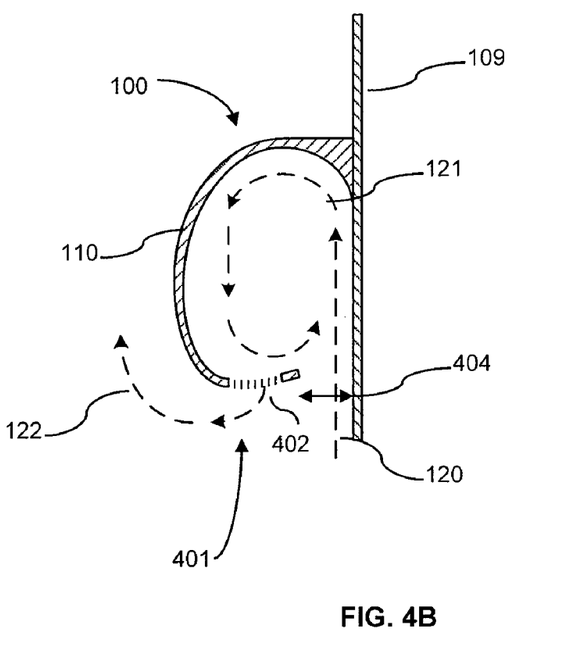

Device 100 can also comprise bottom portion 401 with a plurality of ventilation openings 402 as a safety measure as illustrated in FIGS. 4A and 4B. Specifically, FIG. 4A shows a sectional bottom pane view and FIG. 4B shows a sectional side pane view of cooking vessel wall 109 and device 100. Specifically, bottom portion 401 extends from the end of body 110 towards side wall 109 leaving space 404 therebetween. Furthermore, plurality of ventilation openings 402 are provided through bottom portion 401. In use, heat will enter the interior of device 100 though space 404 along direction 120.

The heat will circulate within, along direction 121, while heating side wall 109 of cooking vessel 101. After transferring heat, the bottom portion will assist heat circulation while allowing excessive heat to safely exit device 100.

Figure 5:
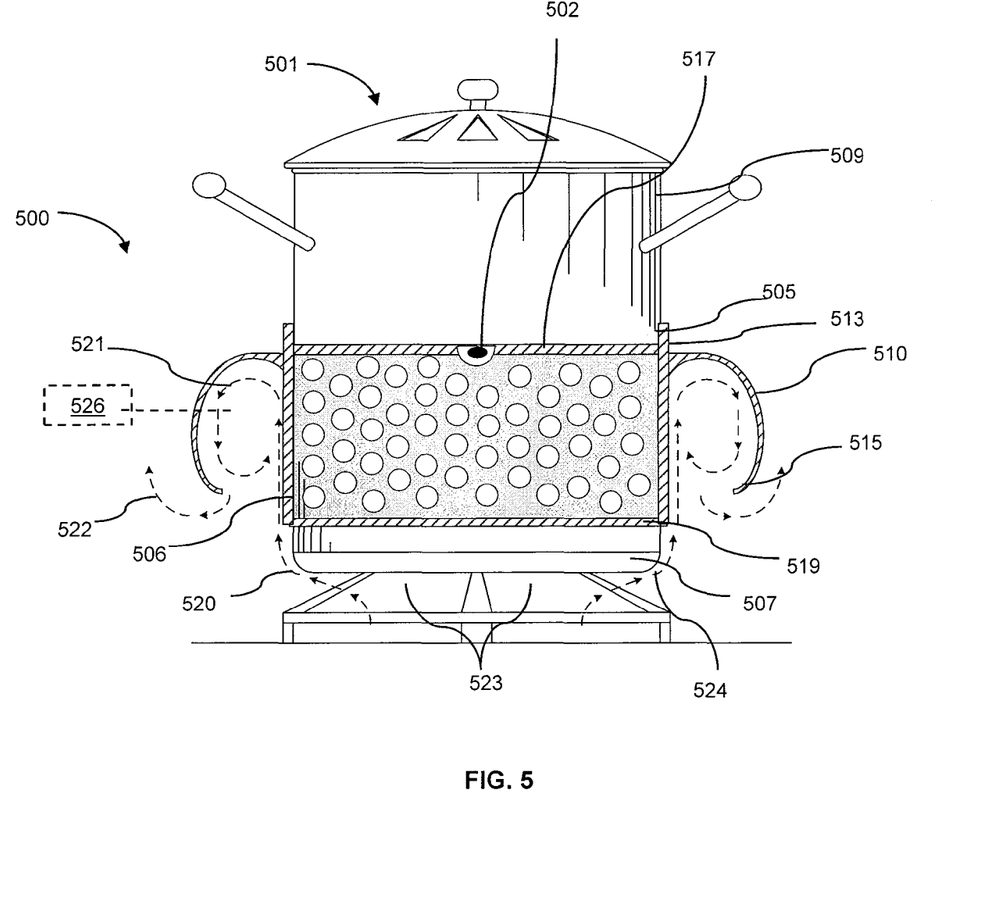
FIG. 5 illustrates a removable and adjustable device with a perforated skirt for transferring heat without warping in accordance with an embodiment of the invention.

Referring now to FIG. 5, there is shown an adjustable and removable device 500 in another embodiment of the invention. Particularly, device 500 has a generally cylindrical "slip" portion 506 and a skirt-like body portion 510 coupled to a generally cylindrical portion 505. Cylindrical portion 505 is substantially the same as cylindrical portion 106 shown in FIGS. 1A-1C and is generally cylindrical in shape. Cylindrical portion 505 is provided to circumferentially couple against side wall 509 of cooking vessel 501. Cylindrical portion 505 includes attachment means 502 to attach device 500 to sidewall 509 of cooking vessel 501 and may include, in some non-limiting examples, a clasp, a buckle, a bolt, a screw, a pin, a rivet, a snap, a strap, a magnet, a male to female connection or the like.

Further, body portion 510 is substantially similar to skirt-like body 110 of an embodiment shown in FIGS. 1A-1C. Specifically, body portion 510 is generally semi-spherical in shape and is circumferentially coupled to cylindrical portion 505 at a first edge 513. Body portion 510 extends outwardly from edge 513 and away from side wall 509 and then gradually extends both outwardly and downwardly and terminates into a second edge 515. Also, slip portion 506 is generally cylindrical in shape, is perforated and is provided to hug sidewall 509 of, in one non-limiting example, cooking vessel 501. Slip portion 506 is coupled to cylindrical portion 505 at edge 517 and emanates and terminates into edge 519 in a direction directly opposite edge 517. It should be appreciated that slip portion 506 including edges 517 and 519 are perforated to prevent warping of slip portion 506 when heat, through conduction, is applied to slip portion 506 from heat source 524. It should also be appreciated that slip portion 506 is provided to be flush with sidewall 509 and may have a vertical cut along slip portion 506, extending from edge 517 to edge 519, to allow the device 500 to be assembled on or removed from a cooking vessel having varying circumferential dimensions.

In another embodiment, cooking vessel 501 may be offered pre-manufactured with device 500 for recovering, harnessing and reutilizing heat. As such, device 500 may be integrally welded onto side wall 509 of cooking vessel 501 or can be mounted via attachment means such as a screw, a bolts a pin, a clasp, a buckle, a rivet, a snap, a strap, a magnet, a male to female connection or the like, thereby integrating slip portion 506 into side wall 509 and causing side wall 509 to have added thickness for conducting heat to the cooking vessel 501. Also, body portion 510 can further assist with directing heat circulation, through convection, in addition to being an intervening heat conducting medium.

In operation as shown in FIG. 5, device 500 is wrapped around cooking vessel 501 and positioned at a desired location. Then, device 500 is adjusted to hug the exterior surface of sidewall 509 by wrapping cylindrical portion 505 around circumferentially around side wall 509 at a preferred height, which correspondingly wraps slip portion 506 around side wall 509. When device 500 is tightly positioned on sidewall 509, it is secured in place via attachment means 502. Following the placement of device 500 onto cooking vessel 501, cooking vessel 501, with contents to be cooked, is placed on or in a close upward proximity to a heat source 523 (e.g., a burner), as illustrated in FIG. 5. The flame of the heat source 523 heats the bottom portion 507 of cooking vessel 501 and continues to rise along directions 520 and 524. Heat rises, runs up side wall 509 of cooking vessel 501 along directions 520 and 523 until it makes contact with body portion 510. The body portion 510 is heated and then transfers that heat via conduction to portion 506. As body mass temperature of portion 506 is at a higher temperature than body mass temperature of sidewall 509, heat transfer will occur through conduction. That is, energy will be transferred from the heated area of portion 506 to the unheated area of sidewall 509.

Further, heat from heat source 523 will continue to rise and contacts edge 513 of body portion 510 and is restrained within the cavity 526 formed between slip portion 506 and body portion 510 under device 500. Within cavity 526, the heat banks down by the upper section of body portion 510 to a point dependent upon the burner setting, follows the shape of the body portion's 510 underside, and circulates along direction 521, all the time heating and raising the temperature of slip portion 506. The harnessed heat continues to heat device 500 and that heat is absorbed and transferred via conduction to sidewall 509 of cooking vessel 501, thereby exposing more than three times the area to heat than in conventional cooking.

As the heat circulates under device 500, it continuously heats portions 506 and 510 through convection. As such, cooking vessel 501 is exposed to more heat through heat transfer from portions 506 and 510 through conduction and convection than if device 500 was not present, thereby heating the contents inside cooking vessel 501 faster. Advantageously, as the heat circulates under device 500, it transfers heat onto portion 506, and exits if too much heat enters the device along direction 522. Also, the heat source 523 may be adjusted accordingly to control the quantity of heat that exits the device 500. This process allows the entire area of portion 506 to be heated and subsequently transferred to sidewall 509 more than tripling the area heated in conventional cookware, while using considerably less energy.

Preferably, the device 500 will be manufactured from a durable metal or metal alloy or any other like material known in the art that will not warp under exposure to operational heat. Some other desirable material properties include smoothness, high thermal conductance, lightweight, and high melting point. Furthermore, the exterior surface of body portion 510 and slip portion 506 may be coated or be cased in a heat shield. The heat shield may keep the outside surface of the device 500 relatively cool and safe to the touch. Additionally, cooking vessels can be offered pre-manufactured with the device 500 for harnessing and transferring heat.

Figure 6A:
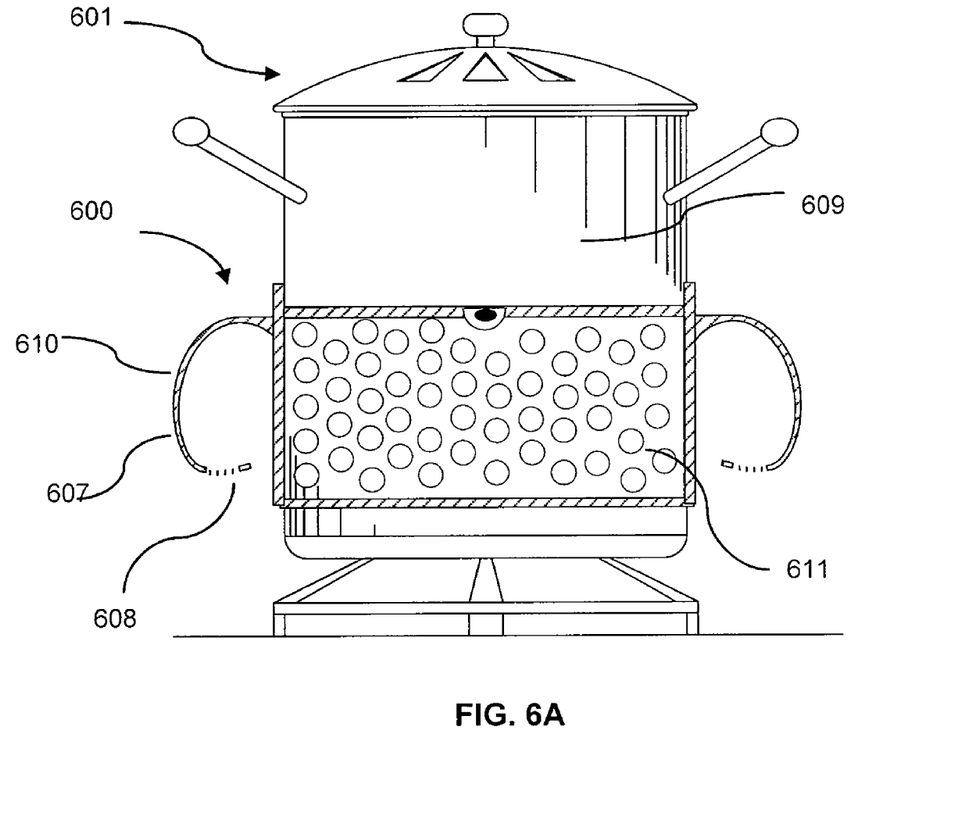
FIG. 6A illustrates a cooking vessel with a removable and adjustable device with a slip in accordance with an embodiment of the invention.

FIG. 6A illustrates an adjustable and removable device 600 in another embodiment of the invention. As shown, cooking vessel 601 has a device 600 selectively attached to sidewall 609. Device 600 is substantially similar to device 500 (shown previously in FIG. 5) and comprises skirt body 610 connected to a generally cylindrical and perforated slip portion 611. As illustrated, body 610 comprises lip portion 607, which adds curvature to skirt body 610, thus assisting with directing heat circulation. In other non-limiting embodiments, lip portion 607 may have a plurality of ventilation openings 608 to provide for heat to safely exit device 600.

Figure 6B:
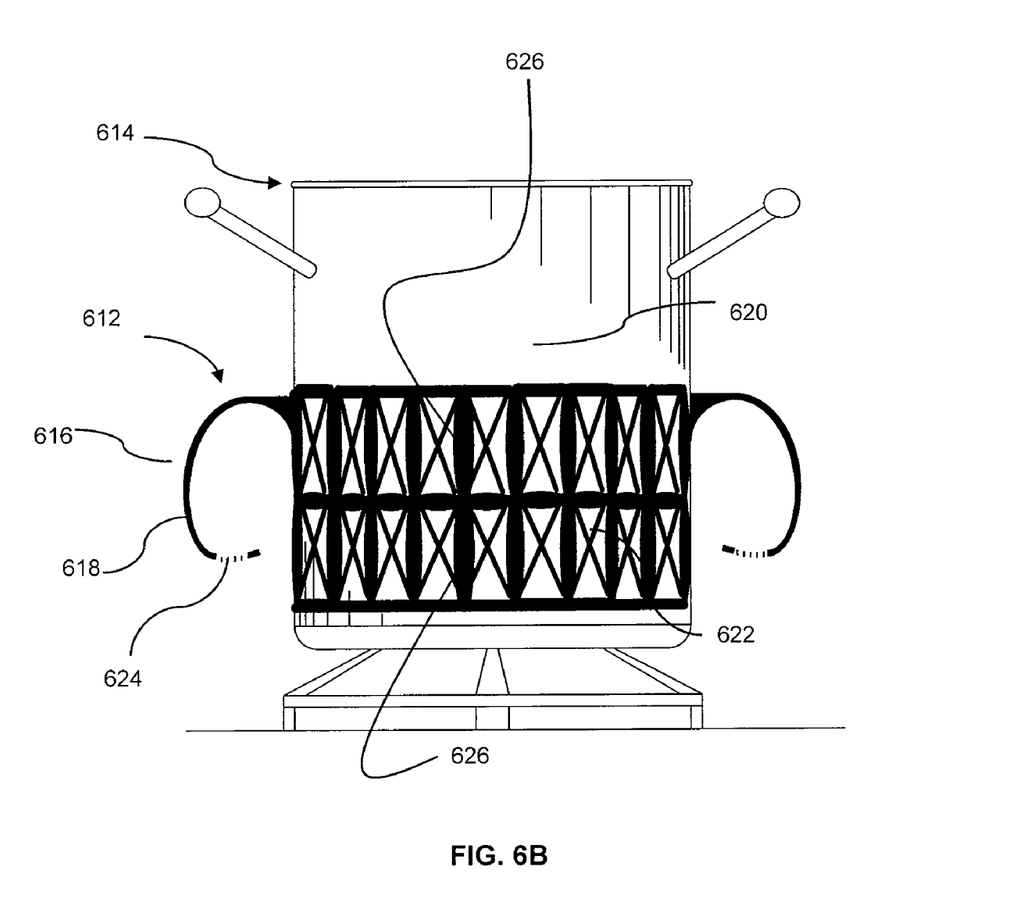
FIG. 6B illustrates a cooking vessel with a removable and adjustable device with a slip in accordance with another embodiment of the invention.

FIG. 6B illustrates an adjustable and removable device 612 in another embodiment of the invention. As shown, cooking vessel 614 has a device 612 selectively attached to sidewall 620 and can be mounted via attachment means such as a screw, a bolts a pin, a clasp, a buckle, a rivet, a snap, a strap, a magnet, a male to female connection or the like. In another non-limiting embodiment, device 612 may be integrally molded into sidewall 620. Device 612 is substantially similar to device 600 (shown previously in FIG. 6A) and comprises skirt body 616 connected to a generally cylindrical and perforated slip portion 622. Slip portion 622 is, preferably, perforated and has a plurality of diffusers 626 on the outer surface. As illustrated, body 616 comprises lip portion 618, which adds curvature to skirt body 616, thus assisting with directing heat circulation. Also, lip portion 618 may have a plurality of ventilation openings 624 to provide for heat to safely exit device 612. The perforations in slip portion 622 help with heat distribution and aid in cooling and preventing warping during heating of the cooking vessel 614.

Figure 7A:
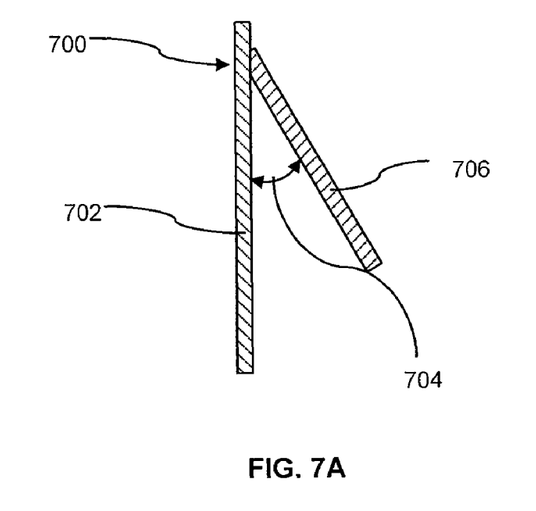
FIGS. 7A, 7B and 7C illustrate a view of some non-limiting shapes of the skirt on the adjustable device in accordance with the embodiments the invention.
Figure 7B:
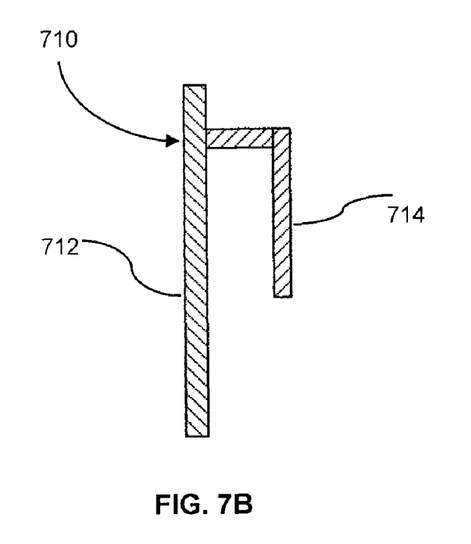
Figure 7C:
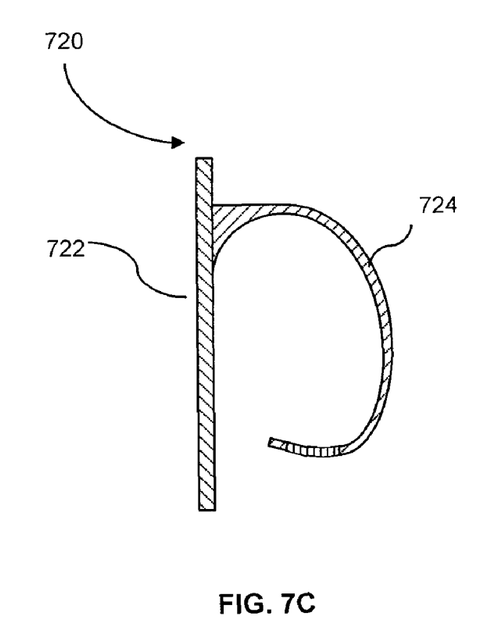

Referring now to FIGS. 7A, 7B and 7C, there is shown different curvatures of the skirt body according to the embodiments of the invention. As shown in FIG. 7A, device 700 includes a slip portion 702 forming an acute angle 704 with skirt body 706 and having a generally "triangular" shape (FIG. 7A). As shown in FIG. 7B, device 710 includes a slip portion 712 having a generally square-shaped skirt body 714 (FIG. 7B). As shown in FIG. 7C, device 720 includes a slip portion 722 coupled to a generally curved skirt-body 724. The different curvatures of devices 700, 710 and 720 are provided to harness the rising heat from the bottom of cooking vessel (not shown) as it collects inside the skirt-bodies 700, 710 and 720.

From the foregoing description of the preferred embodiments, which have been set forth in considerable detail for the purpose of making a complete disclosure of the invention, it can be seen that the invention comprises a device for harnessing and transferring heat to the side wall of a cooking vessel. The device can be permanently attached to the cooking vessel or it can be removable and adjustable. Specifically, the device includes a skirt-like body extending from a side wall of a cooking vessel and a slip-like portion, which is perforated and is provided to hug the sidewall of the cooking vessel. The device can further comprise features such as a lip portion, diffusers, bottom portion with a plurality of ventilation openings, and heat shield.

The skirt works by rescuing/recovering, harnessing and reutilizing all the energy/heat normally lost in the cooking process. The skirt enlists two method of heat transfer in its process. The convected heat is harnessed under the skirt, heats the skirt and the heat is transferred via conduction to the sides of the vessel, exposing over three times the area to heat than in conventional cooking. With this process, the burner setting can be set at low and end at simmer. The skirt saves time, money and energy, with no waste. The skirt is safe, ultra energy-efficient, environmentally friendly and timely. With the efficiency, the skirt becomes economical as it pays for itself many times over through reduced energy usage and its efficiency over time on the environment are significant. The skirt is also adaptable to other appliances, such as water heaters and boilers. With the skirt, the food is not only heated from the bottom up, but also from the sides inward.

It will be appreciated by those skilled in the art that changes can be made to the embodiments described above without departing from the broad inventive concept thereof. It is understood, therefore, that this invention is not limited to the particular embodiments disclosed, but it is intended to cover all modifications that are within the scope and spirit of the invention as defined by the appended claims.

What is claimed is:

1. A device for attachment to a side wall of a cooking vessel, comprising:
   a cylindrical element mounted to or attached to said side wall of said cooking vessel at a first elevation above a bottom end portion of said cooking vessel;
   a perforated portion attached to said cylindrical element; and
   a body element extending from said cylindrical element, wherein said body element comprises a first end portion that is attached to or integrally molded to said cylindrical element and a second end portion which is located at a distance from said side wall, and further wherein said body element extends has a curved cross-section adapted to extend about a periphery of said cooking vessel, away from said side wall, and downwardly to a second elevation above said bottom end portion of said cooking vessel; wherein said body element includes a bottom portion connected to said second end portion; and wherein said bottom portion comprises a plurality of ventilation openings.

2. A device according to claim 1, wherein said perforated portion is cylindrical and extends from said first elevation to a third elevation above said bottom end portion of said cooking vessel.

3. A device according to claim 2, wherein said body element further comprises a first end portion attached to or secured to said cylindrical element and a second end portion which is located at a distance from said side wall of said cooking vessel and at said second elevation above said bottom end portion of said cooking vessel, wherein said body element has a curved cross section shaped to extend from said first end portion, away from said side wall and downwardly to said second end portion.

4. A device according to claim 3, wherein said body element further comprises, at said second end portion, a lip portion which extends from said second end portion in a direction downwardly and towards said side wall of said cooking vessel.

5. A device according to claim 3, wherein said body element further comprises a bottom portion connected to said second end portion.

6. A device according to claim 5, wherein said bottom portion comprises a plurality of ventilation openings.

7. A device according to claim 1, wherein said body element further comprises a plurality of diffusers.

8. A device according to claim 1, wherein said body element causes heat transfer to continue after a heat source or an energy source is removed from said bottom end portion of said cooking vessel.

9. A device according to claim 8, wherein said cooking vessel causes food to stay hotter for a longer time after removal of said heat source or said energy source by insulating said cooking vessel.

10. A device according to claim 1, wherein said cylindrical element comprises an attachment means for attaching or securing said device to said side wall of said cooking vessel.

11. A device according to claim 10, wherein said attachment means comprises a clasp, a buckle, a bolt, a screw, a pin, a rivet, a snap, a strap, a magnet, or a male to female connection.

12. A device according to claim 1, further comprising an adjusting means to adjust said cylindrical element to fit differently sized cooking vessels.

13. A cooking vessel, comprising:
    a bottom end portion of said cooking vessel, a side wall of said cooking vessel, and an opening at a top end portion of said cooking vessel;
    a cylindrical element, wherein said cylindrical element is integrated to said side wall of said cooking vessel at a first elevation above said bottom end portion of said cooking vessel;
    a perforated portion attached to said cylindrical element; and
    a body element extending from said cylindrical element, wherein said body element is attached to or integrally molded to said perforated portion, and further wherein said body element extends about a periphery of said cooking vessel and downwardly to a second elevation above said bottom end portion of said cooking vessel;

wherein said body element comprises a first end portion attached to or secured to said cylindrical element and a second end portion which is located at a distance from said side wall of said cooking vessel and at said second elevation above said bottom end portion of said cooking vessel, wherein said body element has a curved cross section shaped to extend from said first end portion, away from said side wall and downwardly to said second end portion; and wherein said body element further comprise a bottom portion connected to said second end portion, and wherein said bottom portion comprises a plurality of ventilation openings.

14. A cooking vessel according to claim 13 wherein said perforated portion is cylindrical and extends from said first elevation to a third elevation above said bottom end portion of said cooking vessel.

15. A cooking vessel according to claim 14, wherein said body element further comprises a first end portion attached to or secured to said cylindrical element and a second end portion which is located at a distance from said side wall of said cooking vessel and at said second elevation above said bottom end portion of said cooking vessel, wherein said body element has a curved cross section shaped to extend from said first end portion, away from said side wall and downwardly to said second end portion.

16. A cooking vessel according to claim 15, wherein said body element further comprises, at said second end portion, a lip portion which extends from said second end portion in a direction downwardly and towards said side wall of said cooking vessel.

17. A cooking vessel according to claim 16, further comprising a cover for covering said opening at a top end portion of said cooking vessel.

18. A cooking vessel according to claim 17, wherein said cover comprises a plurality of vents.

19. A cooking vessel according to claim 18, wherein said body element further comprises a plurality of diffusers.

20. A cooking vessel according to claim 15, wherein said body element further comprise a bottom portion connected to said second end portion.

21. A cooking vessel according to claim 20, wherein said bottom portion comprises a plurality of ventilation openings.

22. A method for harnessing and transferring heat to a side wall of a cooking vessel, comprising the steps of:
attaching to a cooking vessel a device comprising:
a cylindrical element for attaching the device to the side wall of the cooking vessel, wherein the cylindrical element is mounted to or attached to the side wall of the cooking vessel at a first elevation above a bottom end portion of the cooking vessel;
a perforated portion attached to the cylindrical element; and
a body element extending from the cylindrical element, wherein the body element is attached to or integrally molded to the perforated portion, and further wherein the body element extends about a periphery of the cooking vessel and downwardly to a second elevation above the bottom end portion of the cooking vessel;

applying a heat source from a stove top or heat source providing device to the cooking vessel; and
directing heat via conduction to the side wall of the cooking vessel with the body element of the device;
wherein said body element comprises a first end portion attached to or secured to said cylindrical element and a second end portion which is located at a distance from said side wall of said cooking vessel and at said second elevation above said bottom end portion of said cooking vessel, wherein said body element has a curved cross section shaped to extend from said first end portion, away from said side wall and downwardly to said second end portion; and wherein said body element further comprise a bottom portion connected to said second end portion, and wherein said bottom portion comprises a plurality of ventilation openings.

23. The method of claim 22, wherein the body element further comprises a first end portion attached to or secured to the cylindrical element and a second end portion which is located at a distance from the side wall of the cooking vessel and at the second elevation above the bottom end portion of the cooking vessel, wherein the body element has a curved cross section shaped to extend from the first end portion, away from the side wall and downwardly to the second end portion.

24. The method of claim 23, wherein the perforated portion is cylindrical and extends from the first elevation to the bottom end portion of the cooking vessel.

25. The method of claim 24, wherein the body element further comprises, at the second end portion, a lip portion which extends from the second end portion in a direction downwardly and towards the side wall of the cooking vessel.

26. The method of claim 22, wherein the device causes the cooking vessel to cook in a shorter time thereby using less energy and creating less pollution.

27. The method of claim 22, wherein the device causes the cooking vessel to heat more effectively, thereby saving time and energy.

28. The method of claim 22, wherein the device minimizes heat loss safely and effectively while efficiently cooking the contents of the cooking vessel.

29. The method of claim 22, wherein the device expands as heat is applied thereby preventing warping of the device.

30. The method of claim 22, wherein heat generated by the heat source makes contact with the device, heating the device, and that heat is transferred via conduction to the side wall of the vessel and travels inwards.

31. The method of claim 22, wherein heat generated by the heat source heats the bottom end portion of the cooking vessel and travels upwards.

32. The method of claim 22, wherein the device causes the cooking vessel to be heated at a lower setting of the energy source, thereby saving energy and reducing pollution.

33. The method of claim 22, wherein the device controls heat loss during the cooking process.

34. The method of claim 22, wherein the device recovers, harnesses and reutilizes heat that normally escapes during the cooking process.

35. The method of claim 22, wherein approximately three times the cooking vessel area is exposed to the heat source.

* * * * *